(12) United States Patent
Renato

(10) Patent No.: US 7,438,041 B2  
(45) Date of Patent: Oct. 21, 2008

(54) CONNECTING ROD-CRANK PISTON PIN FOR THE CARRYING OUT OF AN ECCENTRIC CONNECTING ROD SYSTEM PREFERABLY FOR INTERNAL-COMBUSTION ENGINES

(76) Inventor: Garavello Renato, Via dei Gelsi, 8, 36050 Sovizzo (Vicenza) (IT)

( * ) Notice: Subject to any disclaimer, the term of this patent is extended or adjusted under 35 U.S.C. 154(b) by 0 days.

(21) Appl. No.: 11/683,461

(22) Filed: Mar. 8, 2007

(65) Prior Publication Data
US 2008/0216791 A1 Sep. 11, 2008

(51) Int. Cl.
*F02B 75/32* (2006.01)
*F16C 9/00* (2006.01)

(52) U.S. Cl. ...................... 123/197.4; 74/598
(58) Field of Classification Search ........... 123/48 B, 123/78 E, 78 F, 197.4; 74/595, 598
See application file for complete search history.

(56) References Cited

U.S. PATENT DOCUMENTS

| 1,690,296 | A | * | 11/1928 | Hirth | 74/598 |
| 2,364,109 | A | * | 12/1944 | Taylor | 74/597 |
| 2,747,428 | A | * | 5/1956 | Peter et al. | 74/598 |
| 5,207,120 | A | * | 5/1993 | Arnold et al. | 74/595 |
| 5,894,763 | A | * | 4/1999 | Peters | 74/598 |
| 6,164,159 | A | * | 12/2000 | Saker | 74/598 |
| 7,121,252 | B2 | * | 10/2006 | Johnson | 123/197.1 |
| 2002/0083908 | A1 | * | 7/2002 | Moore, II | 123/78 E |
| 2007/0215093 | A1 | * | 9/2007 | Lemke et al. | 123/197.4 |
| 2007/0295122 | A1 | * | 12/2007 | Garavello | 74/44 |
| 2008/0053398 | A1 | * | 3/2008 | Milicic | 123/197.4 |

* cited by examiner

*Primary Examiner*—Hai H Huynh
(74) *Attorney, Agent, or Firm*—Notaro & Michalos P.C.

(57) ABSTRACT

A piston pin carries out an eccentric coupling of connecting rod and crank connected with the driving shaft. The piston pin is shaped like a cylinder, has two cuts disposed orthogonally to the axis of the piston pin. The cuts form three sectors. The two external sectors correspond to the connection with the crank and the internal sector is coupled to the connecting rod.

8 Claims, 4 Drawing Sheets

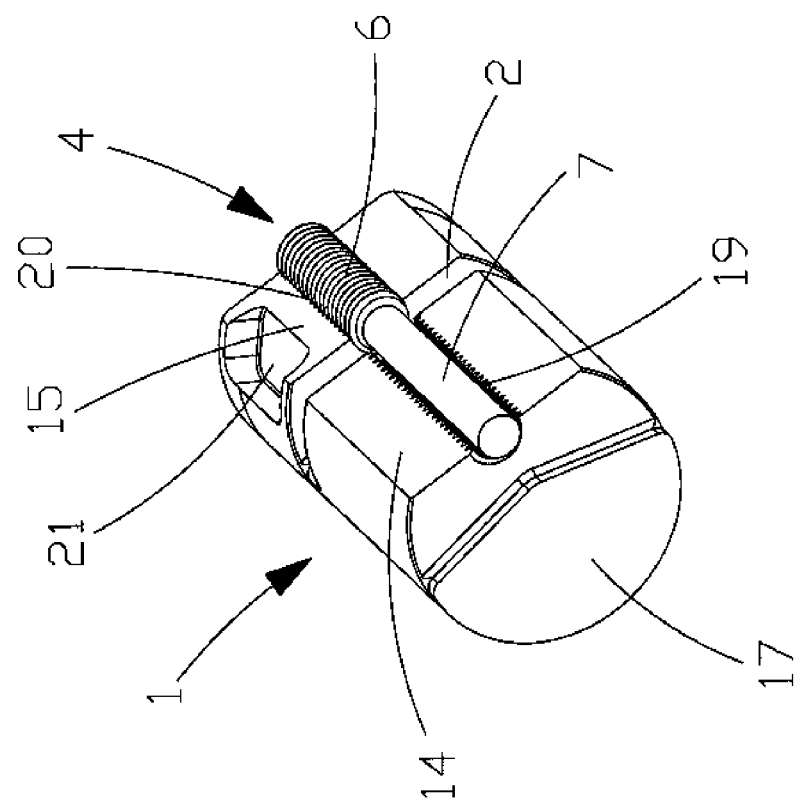
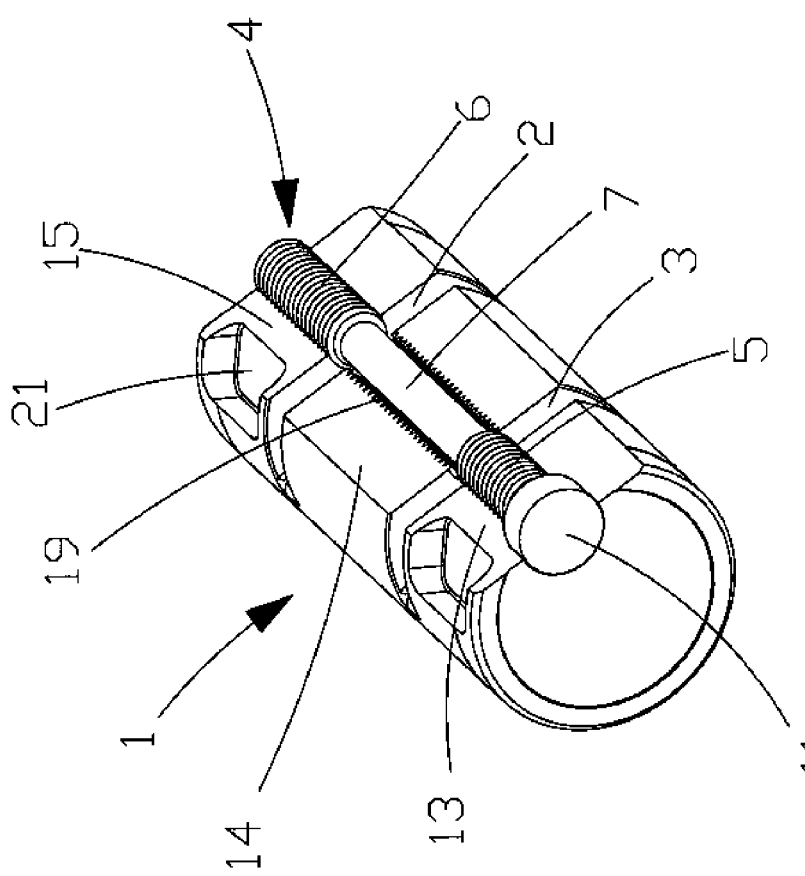

CONNECTING ROD-CRANK PISTON PIN FOR THE CARRYING OUT OF AN ECCENTRIC CONNECTING ROD SYSTEM PREFERABLY FOR INTERNAL-COMBUSTION ENGINES

The object of this invention is a particularly shaped piston pin for the coupling of connecting rod and crank in devices such as internal-combustion engines, engines for presses, steam-operated devices and others.

In particular, the present system permits to obtain an eccentric coupling system for the coupling of connecting rod and crank. In other terms, the present system causes the connecting rod support to work on the crank in an eccentric way, the crank usually being integral with the driving shaft. As is known, it is possible to couple the connecting rod and the crank in an eccentric way so that there is already a torque at the top dead center, with consequent advantages as concerns the performance and the consumption in case of internal-combustion engines.

In fact, in the conventional shape of the connecting rod in respect to the driving shaft, during the "explosion", ideally at the top dead center, there is a cutting force, operated by the piston, with lying straight line passing through the driving shaft, which does not generate any torque but stresses the driving shaft itself and the relative supports.

On the contrary, if there is an eccentric connection of the connecting rod with the driving shaft for the fact that at the top dead center, the connecting rod-crank kinematic coupling is provided with a shifting arm, the connecting rod remains in axis with the driving shaft supports and the actual anchoring point of the connecting rod on the driving shaft is shifted for a predetermined angle and therefore, in the expansion phase, the force of the explosion causes a considerable torque even at the top dead center.

Said particular type of connection needs particular coupling elements to create the connecting rod-crank coupling. The working must be very precise especially in case it is necessary to modify a pre-existing engine. However, said operation is expensive and long.

In case the working is more rapid and not precise, said intervention can cause serious problems as regards the strength and solidity of the engine itself.

Besides, if the connection between connecting rod and crank is rather small as regards the connecting sector, it is possible to make the negative effect of the so-called "iron wire" worse or a connection is obtained which is not flexible, which makes the performance of the engine worse considerably.

The aim and function of the present invention is to solve all the above problems and other ones by carrying out a connecting rod-crank coupling element of simple production and very strong, all the various components for the connection between the piston and the driving shaft being maintained in balance.

Said coupling element is a piston pin that couples connecting rod, crank and driving shaft and forms an eccentric connecting rod system, characterized in that it shows two cuts which are disposed orthogonally to the axis of the piston pin and form three sectors of which the two external sectors correspond to the connection with the crank-driving shaft and the internal sector is connected with the connecting rod.

The so-shaped piston pin permits to obtain an eccentric coupling between the connecting rod and the crank connected with the driving shaft. In particular, said connection can be obtained in a safe and precise way thanks to the rapid carrying out of the two cuts inside the piston pin.

In addition, it is possible to insert a special stabilizing element inside the piston pin. The stabilizing element makes the structure of the piston pin stronger and prevents the unwished "iron wire" effect of the moving components.

Further features and details of the invention will be better understood from the following specification which is supplied as a non-exclusive example on the base of the accompanying drawings wherein:

FIG. 5 shows the piston pin of FIG. 4 sectioned according to a plane which passes through the opening of insertion of the stabilizing element; and FIG. 6 shows the piston pin of FIG. 5 further sectioned according to a plane which is orthogonal to the axis of development of the piston pin and passes through a cut of the piston pin.

Figure 1:
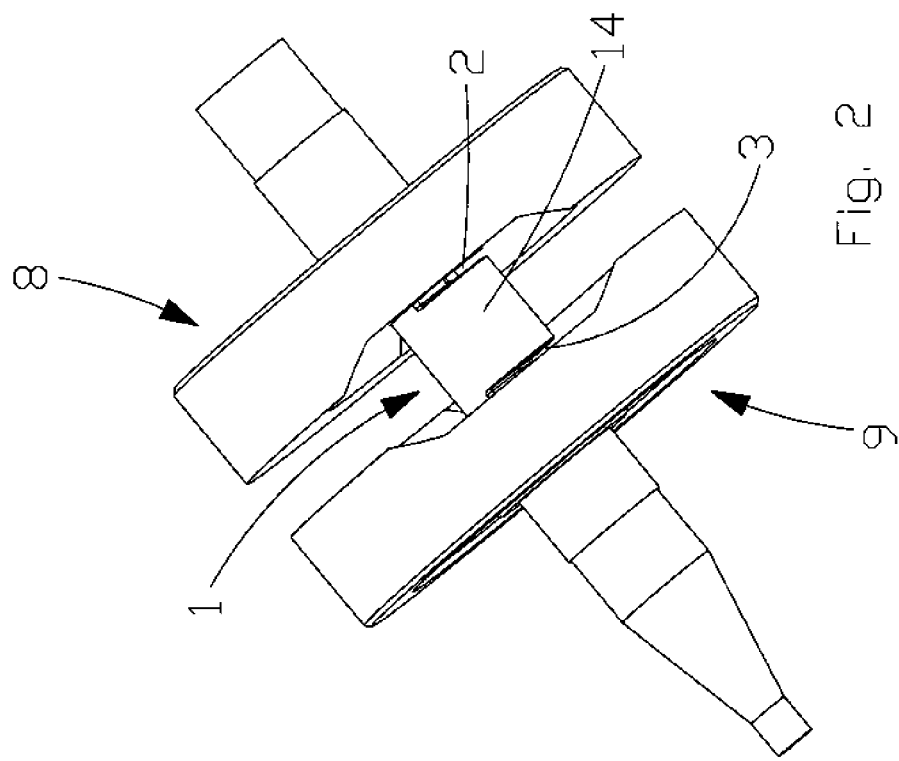
FIG. 1 shows the coupling of the connecting rod with the crank-driving shaft.
Figure 2:
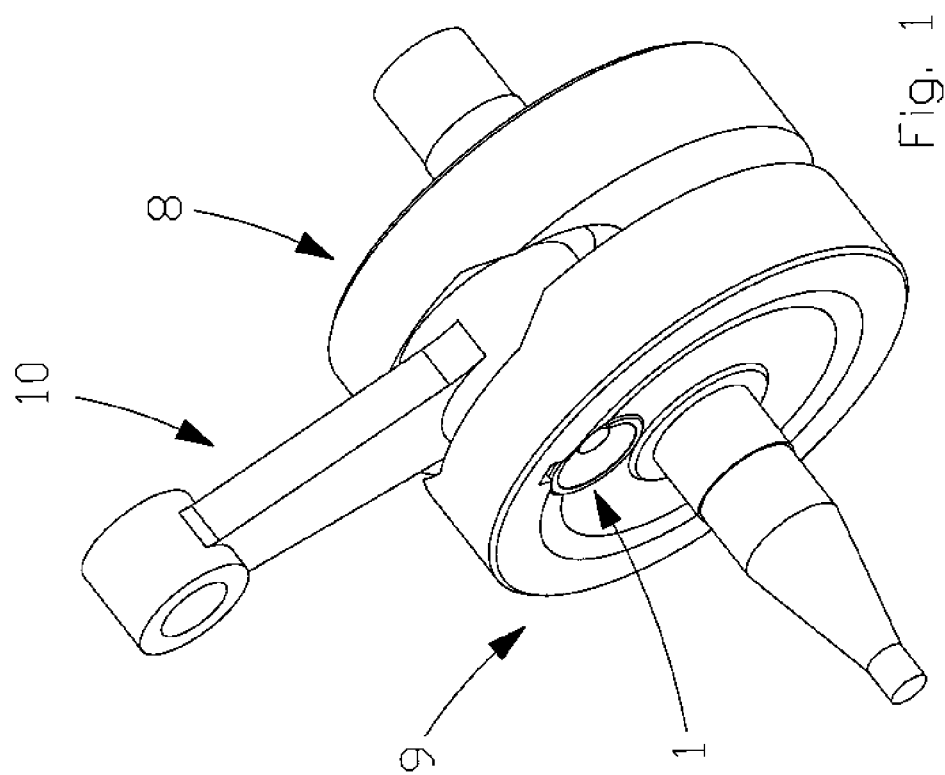
FIG. 2 shows the connection of the two parts of the cranks-driving shaft by means of the connecting piston pin.

With reference to the accompanying drawings, number 1 denotes a piston pin according to the present invention. The piston pin 1 is inserted in suitable seats 22 of the driving shaft-cranks 8, 9 to connect the cranks with a connecting rod 10 which in turn is connected with a piston of the combustion chamber.

In order to obtain an eccentric coupling, the piston pin 1 is provided with two cuts 2, 3. The arrangement of said cuts 2, 3 is orthogonal to the axis of the piston pin 1 as represented in FIG. 5. In this way, the piston pin 1 is subdivided into three sectors: two lateral sectors 13, 15 and a central sector 14, all the three sectors forming an only element through a connecting part 17.

The driving shaft-cranks 8, 9 are coupled with the two lateral sectors 13, 15 of the piston pin 1, respectively and the connecting rod 10 is coupled with the central sector 14 of the piston pin 1 and therefore, the cranks receive a thrust from the connecting rod 10. Said thrust corresponds to a torque. The force of the torque is applied to the barycenter of the connecting part 17 that connects the two lateral sectors 13, 15 with the central sector 14 as it can be seen in FIG. 6.

The eccentricity of said coupling is obtained through the displacement of said barycenter from the central axis of the piston pin 1. The distance of said displacement corresponds to the arm of the torque determined by the connecting rod 10. The longer the distance of the barycenter is from the axis of the piston pin 1, the higher the arm is and consequently, the higher the torque is.

In order to increase the displacement, it is sufficient to make the cuts 2, 3 deeper and to differently dimension the joint section. In addition, the eccentric effect depends on the orientation of said section at the top dead center.

An example of joint section of sectors 13, 14, 15 can be seen in FIG. 6. However, the joint section can have different dimensions and shapes according to the result to be obtained as concerns eccentricity and solidity the structure.

Advantageously, the piston pin 1 according to the present invention is provided with a stud bolt 4 which is positioned inside the piston pin 1. More precisely, the stud bolt 4 is placed in the semicylinder which is subdivided into three parts 13, 14, 15.

In particular, said stud bolt 4 is cylindrical and is provided with two lateral sectors 5, 6 which have a longer diameter than a central sector 7 of the stud bolt 4. Said lateral sectors 5, 6 are threaded sectors and are coupled with openings 18, 20 which have the same passing screw thread and are positioned in the lateral sectors 13, 15 of the piston pin 1.

In this way, said two lateral sectors 13, 15 of the piston pin 1 form an only integral fixed element and prevent the formation of the so-called "iron wire" effect on the driving shaft.

Accordingly, the central sector 14 of the piston pin 1 remains connected only to the remaining sector 17 of the piston pin 1; in fact, the stud bolt 4 passes through the central sector 14 of the piston pin 1 without touching part 14 itself because the diameter of the central sector 7 of the stud bolt 4 is shorter than the opening 19 of said central sector 14.

Besides, the stud bolt 4 is provided with a head 11 which beats on a cavity 12 of the lateral sector 13 of the piston pin 1.

Figure 3:
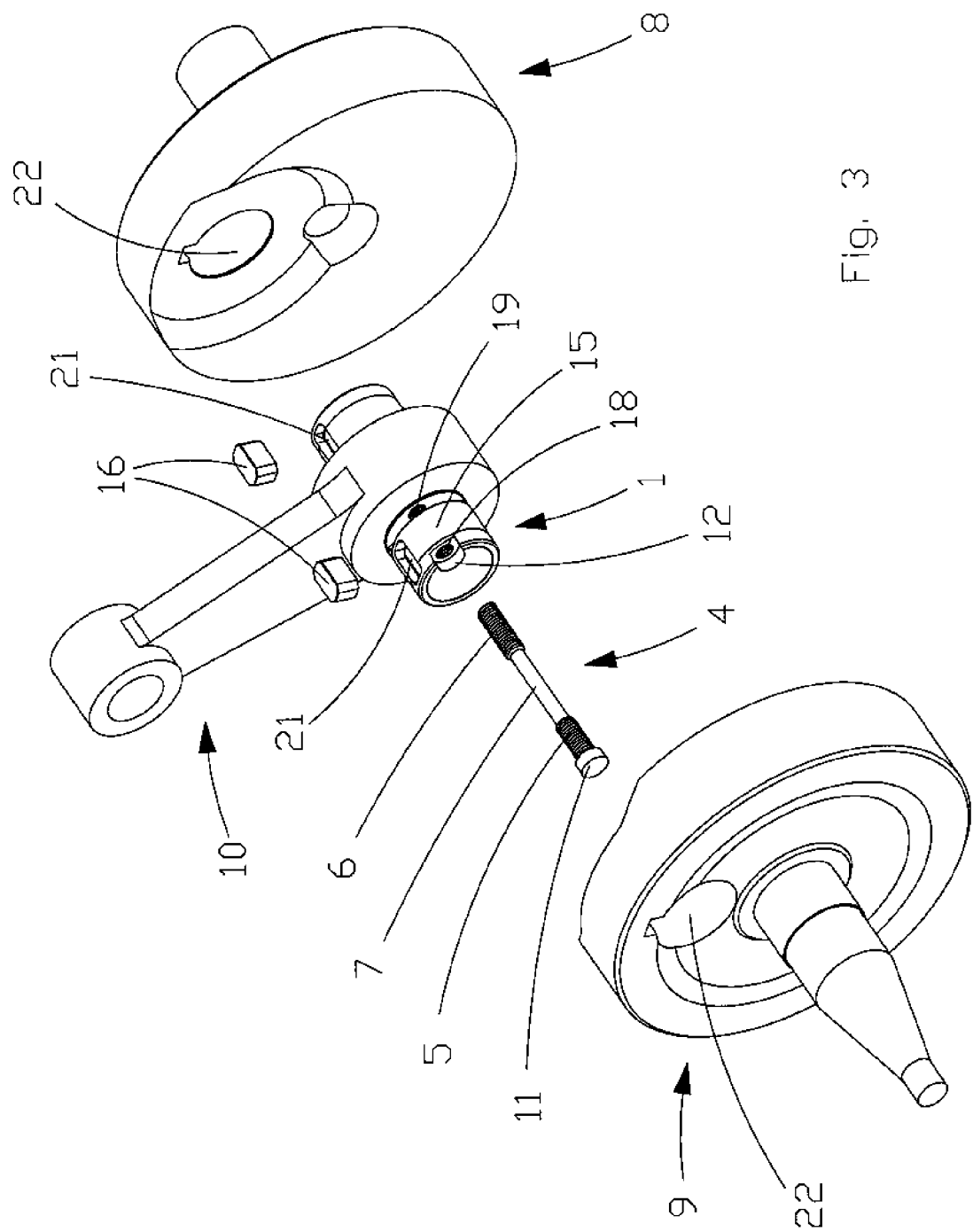
FIG. 3 shows the various components of FIG. 1 in an exploded representation.
Figure 4:
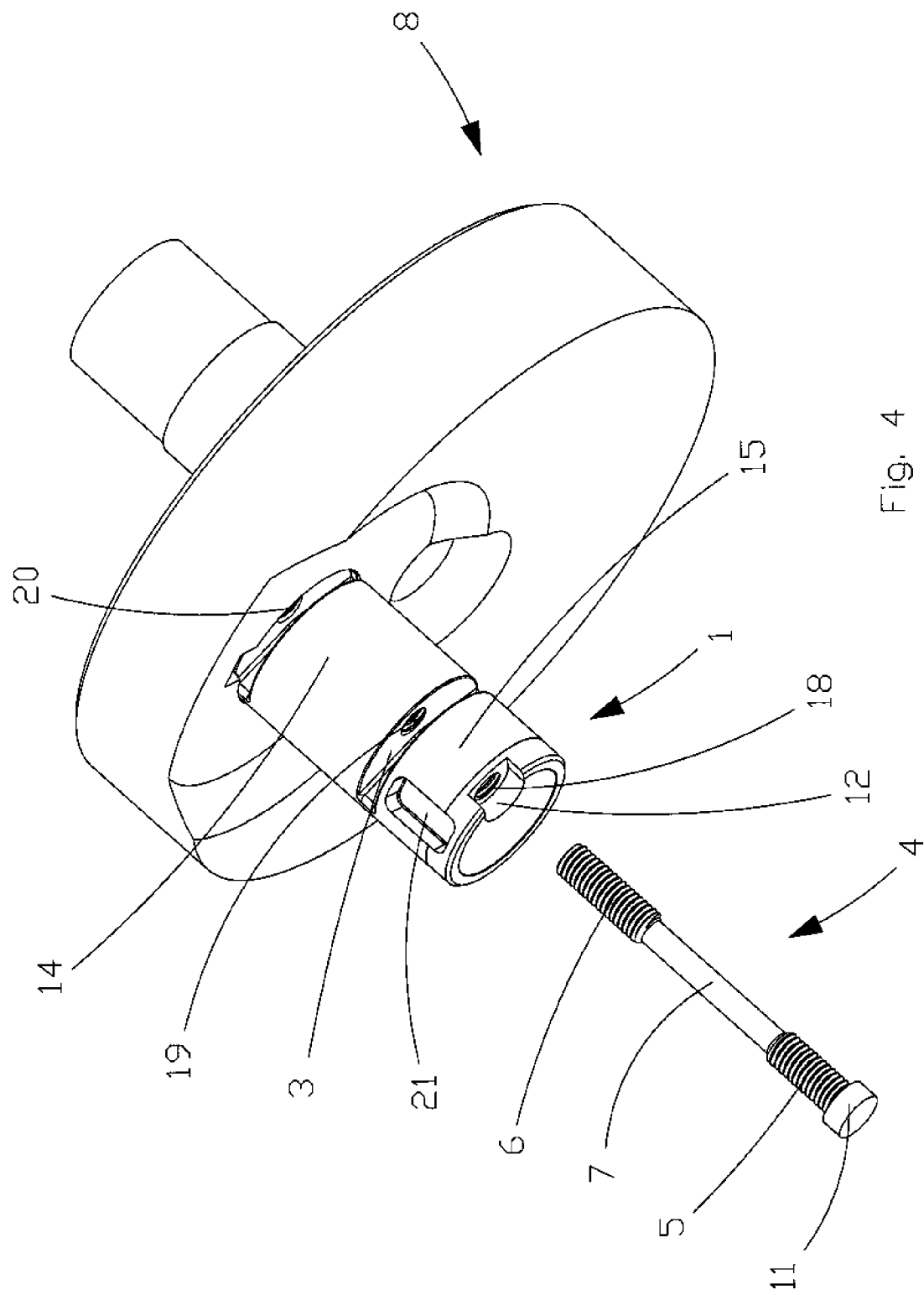
FIG. 4 is a view of the piston pin according to the present invention inserted in a crank-driving shaft.

In FIG. 3, keys 16 are represented. These keys 16 have to be inserted in suitable seats 21 to prevent the piston pin 1 from rotating in relation with the hole 22 in which the piston pin 1 is inserted. Obviously, the anti-rotation blocking system is of the above-described type or alternatively, said system may be of another type according to the need.

The so-shaped piston pin 1 permits to carry out an eccentric connecting rod system with elements that are already present on the driving shaft, just a simple working being required.

A technician of the sector can conceive some changes or versions that are to be considered as included in the scope of protection of the invention.

The invention claimed is:

1. A piston pin (1) for connecting a connecting rod (10) to a crank-drive shaft (8,9) and for forming an eccentric connecting rod system, the piston pin comprising: two cuts (2, 3) which are disposed orthogonally to an axis of the piston pin and form three sectors (13, 14, 15) all having the same diameter of which two sections are lateral sectors (13, 15) forming an eccentric connection with the crank-driving shaft (8, 9) and including between the lateral sections a central sector (14) forming an eccentric connection with the connecting rod (10) and including a joint section (17) formed as one piece between said lateral sectors (13, 15) and said central sector (14).

2. A piston pin (1) as claimed in claim 1, wherein the crank driving shaft (8, 9) receives a thrust from the connecting rod (10) which is connected with the central sector (14) of the piston pin (1), which thrust corresponds to a torque which is applied to the barycenter of the joint section.

3. A piston pin (1) as claimed in claim 1, wherein said cuts (2, 3) form a longitudinal part (17) through which said three sectors (13, 14, 15) form an only element.

4. A piston pin (1) as claimed in claim 1, including a connecting element (4) between said end sectors (13, 15) so that the lateral sectors (13, 15) are integral to each other.

5. A piston pin (1) as claimed in claim 4, wherein said connecting element (4) is a stud bolt which is positioned inside said three sections (13, 14, 15).

6. A piston pin (1) as claimed in claim 5, wherein said stud bolt (4) is cylindrical and is provided with two lateral threaded end parts (5,6) which have a longer diameter and a central part (7) with a smaller diameter than said lateral threaded end parts; said lateral threaded end parts (5,6) are coupled with threaded openings (18, 20) which are positioned in the lateral parts (13, 15) of the piston pin (1); the diameter of said central part (7) of said stud bolt (4) being smaller than the diameter of a through-hole included in the central sector (14) of said piston pin (1).

7. A piston pin (1) as claimed in claim 5, wherein said stud (4) comprises a head (11) which beats on a cavity (12) of one of the lateral sectors (13) of said piston pin (1).

8. A piston pin (1) as claimed in claim 1, including keys (16) positioned in seats (21) to prevent the piston pin (1) from rotating in respect to holes (22) in which the piston pin (1) is inserted.

\* \* \* \* \*